(12) United States Patent
Arend et al.

(10) Patent No.: US 6,980,768 B2
(45) Date of Patent: Dec. 27, 2005

(54) SPREAD SPECTRUM SIGNAL DISTRIBUTION THROUGHOUT A BUILDING

(75) Inventors: Brian L. Arend, Masonville, CO (US); Thomas Schwengler, Lakewood, CO (US)

(73) Assignee: Qwest Communications International, Inc., Denver, CO (US)

( * ) Notice: Subject to any disclaimer, the term of this patent is extended or adjusted under 35 U.S.C. 154(b) by 868 days.

(21) Appl. No.: 09/962,758

(22) Filed: Sep. 25, 2001

(65) Prior Publication Data

US 2003/0060194 A1 Mar. 27, 2003

(51) Int. Cl.[7] ............................................. H04H 1/00
(52) U.S. Cl. ..................................... 455/3.01; 333/248
(58) Field of Search ............................... 455/3.01, 11.1, 455/13.1, 13.3, 16–17, 41.2, 422.1, 426, 455/436, 446, 447, 448, 524, 560, 561, 562.1; 342/22, 52, 53; 333/126, 137, 239, 248; 375/130, 375/131

(56) References Cited

U.S. PATENT DOCUMENTS

| | | | | |
|---|---|---|---|---|
| 4,941,207 A | * | 7/1990 | Maeda et al. | ................ 398/119 |
| 5,903,834 A | * | 5/1999 | Wallstedt et al. | ........ 455/422.1 |
| 5,977,851 A | | 11/1999 | Stancil et al. | |
| 5,994,984 A | | 11/1999 | Stancil et al. | |
| 6,144,292 A | * | 11/2000 | Brown | ................... 340/310.02 |
| 6,463,090 B1 | * | 10/2002 | Dorfman | ..................... 375/131 |
| 6,801,753 B1 | * | 10/2004 | Keong | ........................ 455/3.01 |
| 6,871,081 B1 | * | 3/2005 | Llewellyn et al. | ........... 455/561 |

* cited by examiner

*Primary Examiner*—George Eng
(74) *Attorney, Agent, or Firm*—Brooks Kushman P.C.

(57) ABSTRACT

The use of spread spectrum signaling distributed through a building ventilation system provides an effective and inexpensive communication system. The ventilation system is disposed within the building to move air throughout at least a portion of the building. An access point relays signals to a telecommunications system outside of the building. At least one antenna in communication with the access point is disposed within the ventilation system. Each antenna transmits and receives spread spectrum signals through the ventilation system.

27 Claims, 5 Drawing Sheets

SPREAD SPECTRUM SIGNAL DISTRIBUTION THROUGHOUT A BUILDING

BACKGROUND OF THE INVENTION

1. Field of the Invention

This invention relates to distributing wireless signals throughout a building.

2. Background Art

Wireless devices continue to gain in popularity due to their increased portability and mobility. Such devices include telephones, computers, personal digital assistants (PDAs), pagers, entertainment devices, and the like. These devices work at a variety of modulation frequencies and communicate using a variety of modulation techniques.

One problem with many such devices is the inability to obtain a sufficiently strong communication channel while within a building or similar structure. One solution is to provide a plurality of antennas with supporting wiring and transceivers throughout the building. While this method is effective, it requires extensive infrastructure making such a system expensive and impractical for existing structures. Another proposed solution is to use ventilation duct work existing within a building. However, the solution proposed requires various modifications to the ventilation system including adding electrically translucent grills, ground planes, reflectors, absorbent foams, couplers, and specially constructed sections of ducting.

The ability to transmit and receive wireless signals within a building without extensive modifications is needed. Any solution should be inexpensive and readily adaptable to a wide variety of buildings and structures.

SUMMARY OF THE INVENTION

The use of spread spectrum signaling distributed through a building ventilation system will eliminate or reduce many of the problems associated with previous wireless building communication systems.

To accomplish this goal, a communication system for use inside a building is provided. The system includes an access point relaying signals to a telecommunications system outside of the building. A ventilation system disposed within the building moves air throughout at least a portion of the building. At least one antenna in communication with the access point is disposed within the ventilation system. Each antenna transmits and receives spread spectrum signals through the ventilation system.

The system may include receivers capable of combining a given spread spectrum signal received through multiple paths. The multiple paths may be established through different routs of transmission through the ventilation system. Also, a plurality of antennas may be used to establish multiple transmission paths for a given spread spectrum signal through the ventilation system.

In an embodiment of the present invention, at least one antenna is a monopole antenna attached to a magnetic base.

In yet another embodiment of the present invention, the ventilation system includes at least one passage functioning as a hollow leaky waveguide. This passage may be, for example, a semirigid aluminum duct.

In still another embodiment of the present invention, the ventilation system includes an area formed between an inner surface defining a work area and an outer structural surface.

In a further embodiment of the present invention, the access point is not located within the building. The communication system then includes a repeater in electrical communication with the antenna. The repeater relays spread spectrum signals between the access point and the antenna.

In a still further embodiment of the present invention, the spread spectrum signals comprise CDMA signals. Such signals may operate, for example, around 1.9 GHz or 800 MHz and may have a bandwidth of at least 1.25 MHz.

A method of communicating with a spread spectrum subscriber unit located within a building is also provided. At least one antenna is inserted into a building ventilation system. A spread spectrum signal is transmitted from the subscriber unit into the ventilation system. The spread spectrum signal is propagated within the ventilation system and is received by at least one antenna. This received signal is then transmitted outside of the building.

A method of communicating with a spread spectrum subscriber unit located within a building is also provided. At least one antenna is inserted into a building ventilation system. A signal is received from outside of the building. If the signal is not in spread spectrum format, the signal is converted to spread spectrum format. The spread spectrum signal is transmitted through the antenna into the ventilation system where the spread spectrum signal is propagated along multiple paths. The signal from the ventilation system is received by the subscriber unit.

A wireless local area network for use within a building is also provided. At least one server provides data related services through spread spectrum signals. An antenna for each server is disposed within a ventilation system moving air throughout at least a portion of the building. Computers within the building transmit and receive data as spread spectrum signals through the ventilation system.

A telecommunication system for use inside a building is also provided. The system includes a wireless base station located away from the building. At least one wireless repeater is in communication with the base station. At least one antenna in communication with each repeater is disposed within a building ventilation system. Each antenna transmits and receives spread spectrum signals through the ventilation system.

A telecommunication system establishing multiple sectors inside a building is also provided. A wireless base station, located away from the building, communicates with wireless telecommunication devices through a plurality of sectors. Wireless repeaters in communication with the base station are associated with the building. A plurality of antennas are disposed within a building ventilation system, each antenna in communication with one of the repeaters. Each antenna transmits and receives spread spectrum signals through the ventilation system along multiple paths. The antennas are positioned so as to establish each base station sector in a different portion of the building.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
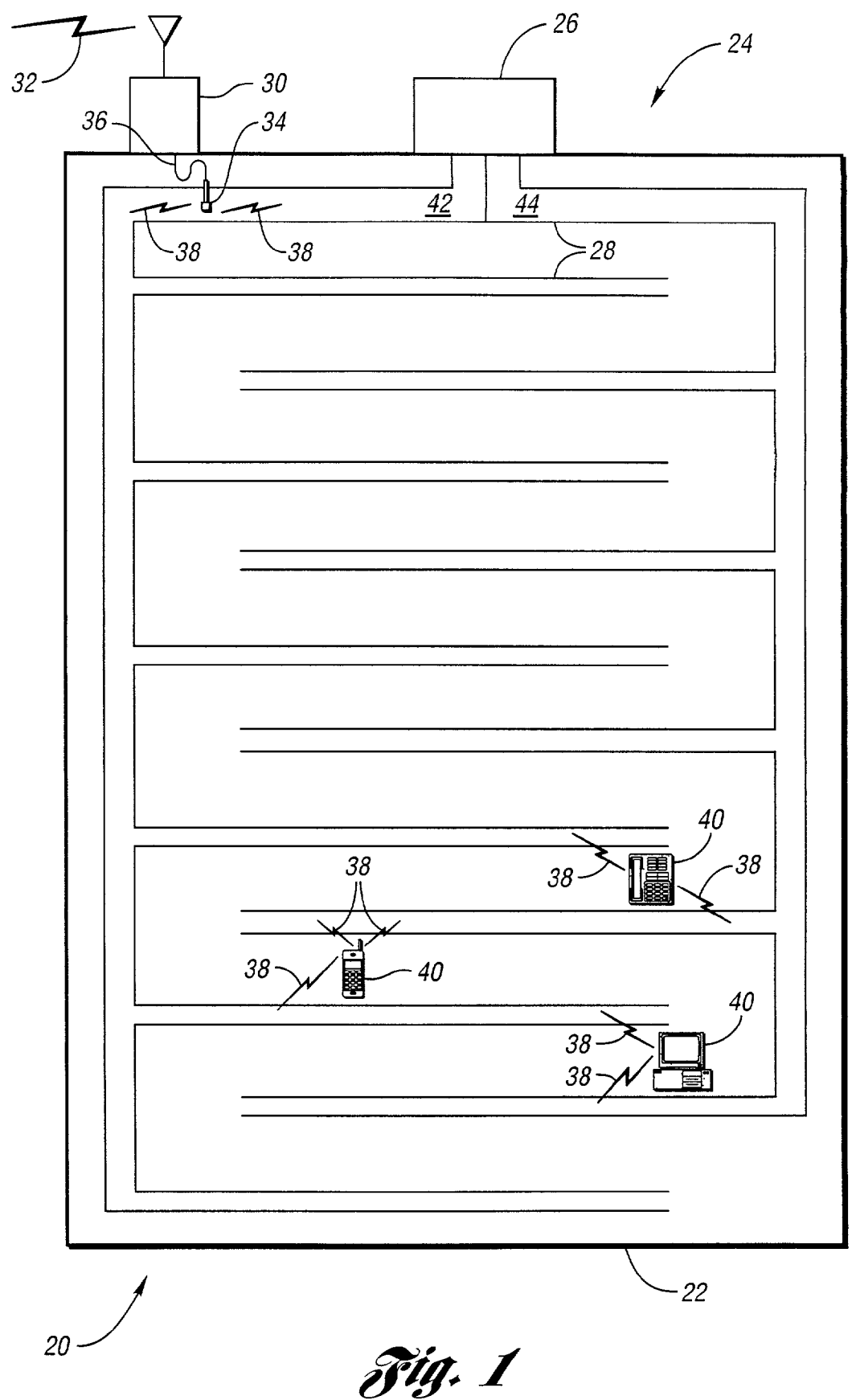
FIG. 1 is a schematic diagram of a building communication system according to an embodiment of the present invention.

Referring to FIG. 1, a schematic diagram of a building communication system according to an embodiment of the present invention is shown. A building communication system, shown generally by 20, is designed to permit wireless communication within building 22 or similar structure. Building 22 includes heating, ventilation and air conditioning (HVAC) system 24. HVAC system 24 includes various equipment 26 for modifying conditions of air such as temperature and humidity. Such equipment can include furnaces, air conditioners, humidifiers, dehumidifiers, and the like. Equipment 26 typically also includes one or more fans to move air throughout building 22. Ducts 28 are provided throughout building 22 to distribute and return air.

Building communication system 20 also includes at least one access point 30 relaying signals 32 to a telecommunication system outside of building 22. Access point 30 may be a wireless base station, repeater, switching system, routing system, or other point-of-presence. Signals 32 sent between access point 30 and the telecommunications system may be sent via a variety of means including wireless radio link, optical fiber, laser, wireline link, and the like.

One or more antennas 34 are disposed within ventilation system 24. Each antenna 34 is connected to access point 30 by cable 36 carrying spread spectrum communication signals. Antenna 34 transmits and receives spread spectrum signals 38 through ventilation system 24. Various wireless communication devices 40 can then communicate with access point 30 and, consequently, with the telecommunication system by sending and receiving spread spectrum signals through ducts 28.

Preferably, wireless communication devices 40 can send and receive spread spectrum signals 38 through a plurality of paths in ducts 28. Multiple paths may be created by different air flow paths in ventilation system 24, by multiple antennas 34 located within ventilation system 24, or by a combination of multiple antennas and multiple paths. For example, typical ventilation systems 24 may include outflow ducts 42 and return ducts 44. Each subsystem 42, 44 may include one or more antenna 34 allowing access point 30 to establish a different sector in each subsystem 42, 44. Wireless communication device 40 is capable of establishing a link through either subsystem 42, 44 individually or both subsystems 42, 44 simultaneously, as is known in the art of CDMA communication.

Figure 2A:
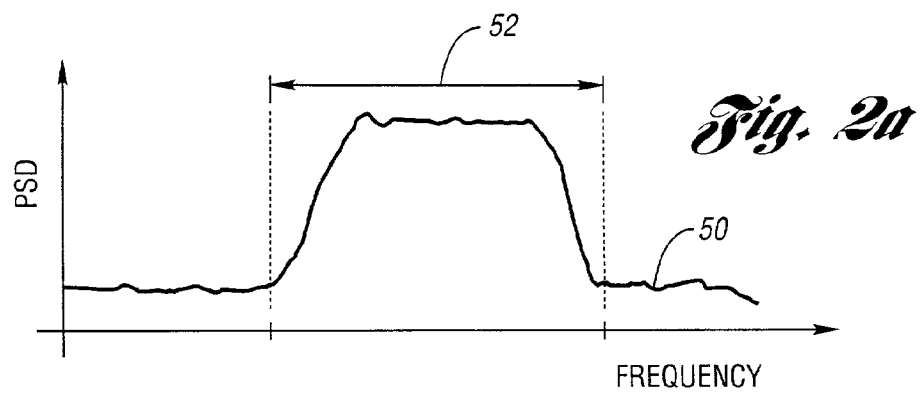
FIGS. 2a and 2b are graphs illustrating power spectral density for a spread spectrum signal at the input and output, respectively, of a building ventilation system according to an embodiment of the present invention.
Figure 2B:
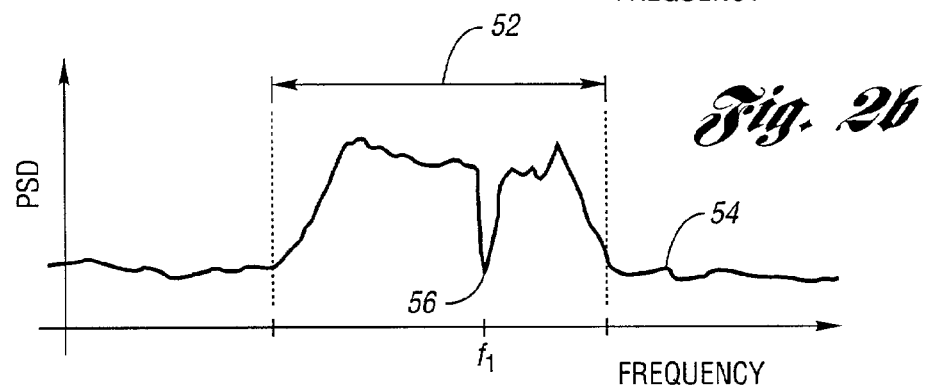

Referring now to FIGS. 2a and 2b, graphs illustrating power spectral density for a spread spectrum signal at the input and output, respectively, of a building ventilation system according to an embodiment of the present invention are shown. Plot 50 in FIG. 2a illustrates the power spectral density for spread spectrum signal 38 as input into ventilation system 24. Spread spectrum signal 38 is characterized by a wide bandwidth 52. For example, PCS CDMA signal 38 has bandwidth 52 of approximately 1.25 MHz. Other communication signals may have an even greater bandwidth 52. For example, 3G wireless telecommunications signals may have a bandwidth of 5 MHz.

Plot 54 in FIG. 2b shows the power spectral density of spread spectrum signal 38 radiating from ventilation system 24. In this example, a 1.9 GHz or 800 MHz CDMA signal is propagated through a main plenum, reducer, several fans, a length of ducting, a diffusion box, feeder ducts and an air diffuser vent. The result is a general deterioration of spread spectrum signal 38 including notch 56 and frequency $f_1$. Notch 56 represents absorption of radiated energy. The magnitude and location of notch 56 is based on the configuration of ventilation system 24 along a path between where signal 38 is put into ventilation system 24 and the receiver location. Different paths will exhibit different frequencies of attenuation. Typically, wireless device 40 includes a RAKE receiver capable of recovering spread spectrum signal 38 even in the presence of some notches 56, fades, noise, multiple paths, and the like. Thus, the use of spread spectrum signal 38 and multiple paths through ventilation system 24 will greatly simplify building communication system 20.

Figure 3:
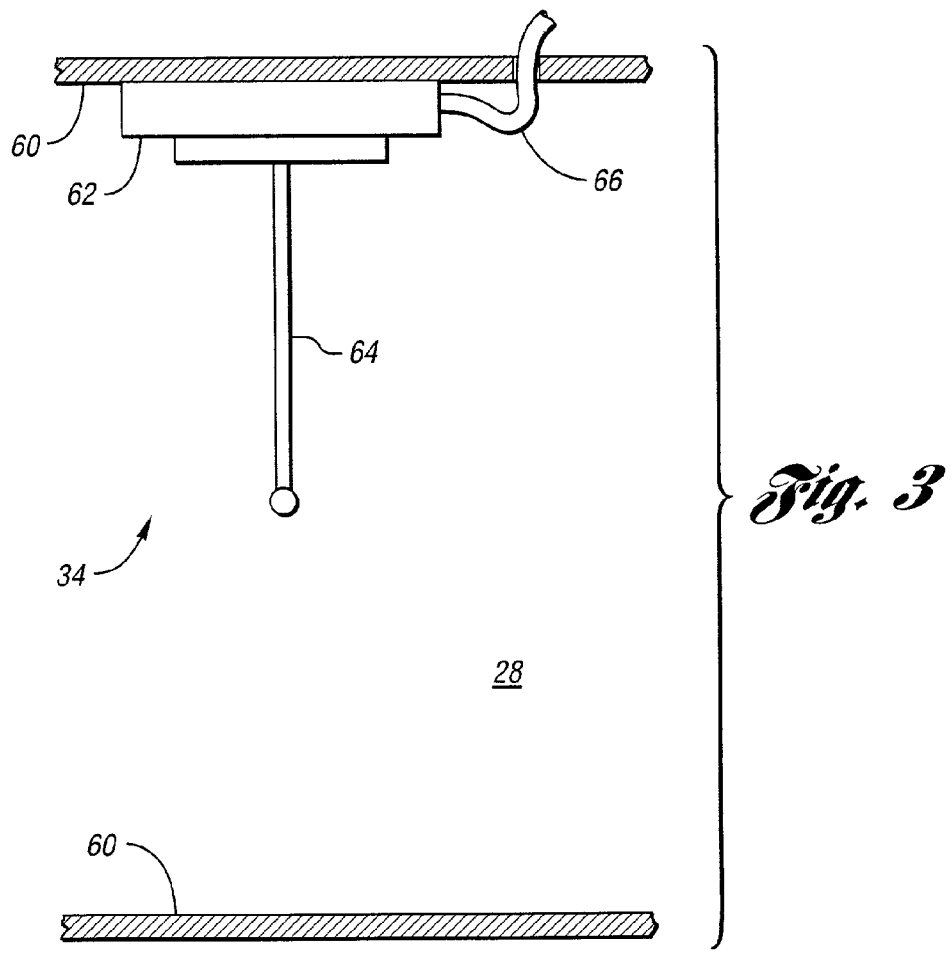
FIG. 3 is a drawing illustrating an antenna for transmitting and receiving spread spectrum signals in a ventilation system according to an embodiment of the present invention.

Referring now to FIG. 3, a drawing illustrating an antenna for transmitting and receiving spread spectrum signals in a ventilation system according to an embodiment of the present invention is shown. Antenna 34 fits within walls 60 of duct 28. Antenna 34 includes magnetic base 62 which may be attached to the inside portion of wall 60. Radiating portion 64 extends from magnetic base 62. Radiating portion 64 is fed by cable 66 connecting radiating portion 64 with access point 30. The use of magnetic base 62 in antenna 34 permits antenna 34 to be easily located within duct 28. Thus, an optimal position for antenna 34 can be easily obtained by moving antenna 34 while monitoring emissions of antenna 34 with a signal meter. Extensive modeling and mathematical calculations are not required.

Figure 4:
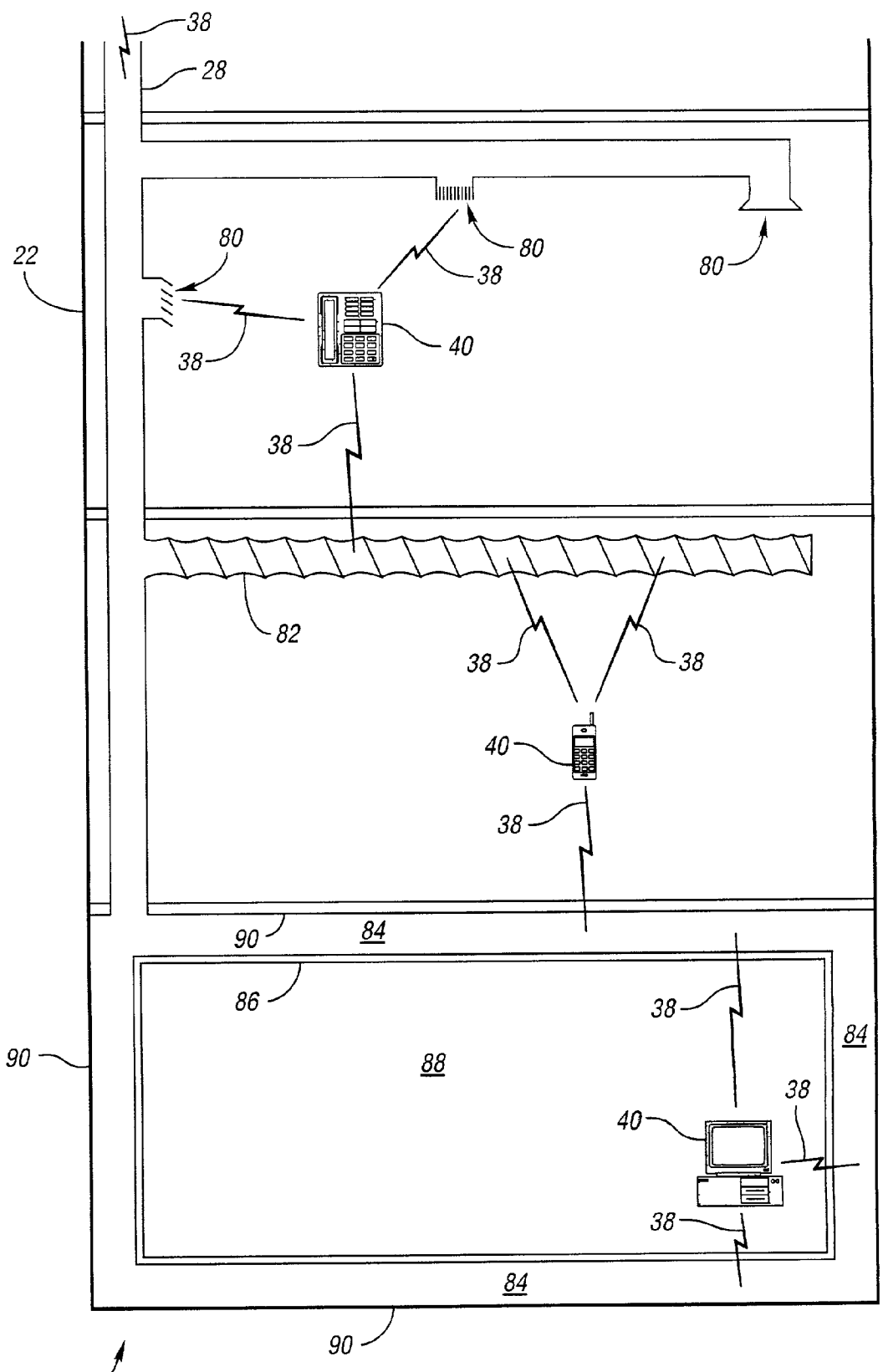
FIG. 4 is a schematic diagram illustrating a variety of means for radiating spread spectrum signals from a ventilation system according to an embodiment of the present invention.

Referring now to FIG. 4, a schematic diagram illustrating a variety of means for radiating spread spectrum signals from a ventilation system according to embodiments of the present invention are shown. Vents 80 may serve as point sources for spread spectrum signal 38 entering or leaving duct 28. Grills for vent 80 may be made of a polymer material so that signal 38 passes through vent 80 regardless of whether vent 80 is open or closed. Another type of point source for signals 38 may be obtained by opening a slot or hole in duct 28 and sealing the hole with a polymer material. This permits signal 38 to pass in to or out of duct 28 without allowing any air to escape.

In addition to point openings in duct 28, ventilation system 24 may include passages functioning as hollow leaky waveguides. For example, a portion of ventilation system 24 may be implemented using semirigid aluminum duct 82 which radiates and accepts spread spectrum signal 38 in a distributive manner along the length of duct 82.

Another distributively radiating means can be created when ventilation system 24 includes one or more areas 84 formed between inner surface 86 defining work area 88 and outer structural surface 90. Area 84 is known by a variety of terms such as plenum, work area, crawl space, and the like. Inner surface 86 may be referred to as a cellular floor, raised floor, access floor, and the like when inner surface 86 is a floor. Similar terms apply when inner surface 86 is a wall or ceiling. Thus, spread spectrum 38 propagates within area 84 distributively radiating through inner surface 86 into work area 88.

Figure 5:
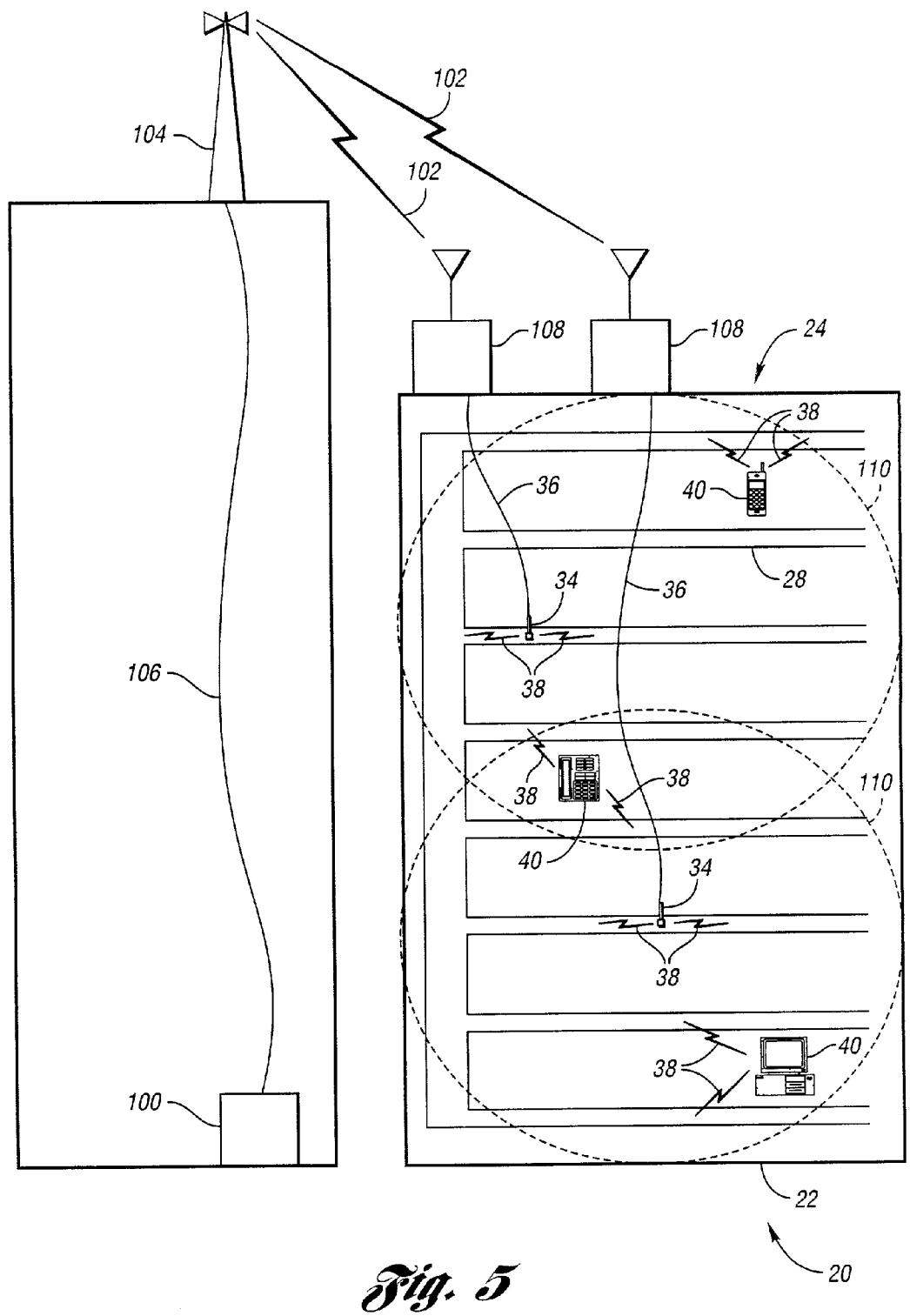
FIG. 5 is a schematic diagram illustrating separate wireless sectors established within a building according to an embodiment of the present invention.

Referring now to FIG. 5, a schematic diagram illustrating separate wireless sectors established within a building according to an embodiment of the present invention is shown. Wireless base station 100 supports a plurality of sectors or cells as is known in the art. Base station 100 transmits and receives spread spectrum signals 102 for each sector through antenna 104 connected to base station 100 through feed 106. Building 22 includes a plurality of repeaters 108. Each repeater 108 is configured to operate with a different sector supported by base station 100. At least one antenna 34 disposed within ventilation system 24 is associated with each repeater 108. Each antenna 34 establishes base station sector 110 within building 22. Antennas 34 are positioned so as to establish each base station sector 110 in a different portion of building 22. Thus, building 22 may be divided into a plurality of sectors 110 if warranted by the number of wireless devices 40 operating within building 22. Sectors 110 may overlap, just as wireless sectors overlap in open spaces. Decisions for selecting between sectors 110 may be based on a variety of factors including signal strength received by wireless device 40, load conditions within each sector 110, and the like. Hand off between sectors 110 is handled by base station 100 as is known in the art.

Figure 6:
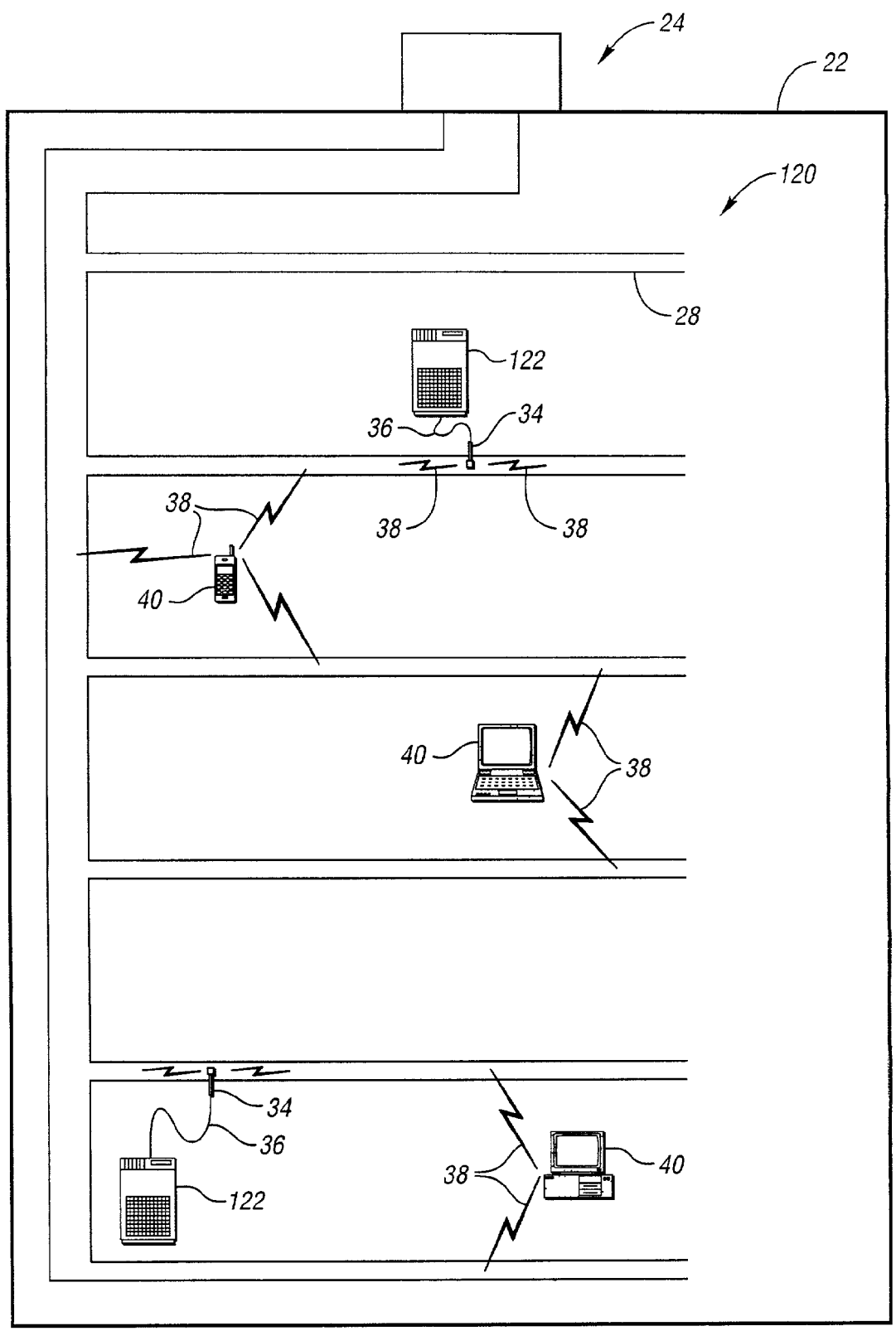
FIG. 6 is a schematic diagram illustrating a building wireless local area network according to an embodiment of the present invention.

Referring now to FIG. 6, a schematic diagram illustrating a building wireless local area network according to an embodiment of the present invention is shown. Communication system 20 includes a wireless local area network, shown generally by 120. Wireless local area network 120 includes at least one server 122 providing data related services through spread spectrum signals 38. Antenna 34, associated with each server 122, is disposed within ventilation system 24 for sending and receiving spread spectrum signals 38. Computers 40 disposed within building 22 transmit and receive spread spectrum signals 38 through ventilation system 24.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A communication system for use inside a building comprising:
   an access point relaying signals to a telecommunication system outside of the building;
   a ventilation system disposed within the building, the ventilation system moving air throughout at least a portion of the building, the ventilation system including at least one passage operative to function as a hollow leaky waveguide; and
   at least one antenna disposed within the ventilation system, each antenna in communication with the access point, each antenna operative to transmit and receive spread spectrum signals through the ventilation system.

2. A communication system as in claim 1 wherein the at least one antenna is a plurality of antennas establishing multiple transmission paths for a given spread spectrum signal through the ventilation system.

3. A communication system as in claim 1 further comprising a plurality of receivers, each receiver operative to combine a given spread spectrum signal received through multiple paths.

4. A communication system as in claim 3 wherein the at least one passage is a semirigid aluminum duct.

5. A communication system as in claim 1 wherein at least one antenna is a monopole antenna attached to a magnetic base.

6. A communication system as in claim 1 wherein the ventilation system comprises an area formed between an inner surface defining a work area and an outer structural surface.

7. A communication system as in claim 1 wherein the access point is not located within the building, the communication system further comprising a repeater in electrical communication with the antenna, the repeater relaying spread spectrum signals between the access point and the antenna.

8. A communication system as in claim 1 wherein the spread spectrum signals comprise CDMA signals.

9. A communication system as in claim 1 wherein the spread spectrum signals operate around 1.9 GHz.

10. A communication system as in claim 1 wherein the spread spectrum signals have a bandwidth of at least 1.25 MHz.

11. A method of communicating with a spread spectrum subscriber unit located within a building comprising:
    inserting at least one antenna into a building ventilation system;
    transmitting a spread spectrum signal from the subscriber unit into the ventilation system;
    propagating the spread spectrum signal within the ventilation system;
    receiving the transmitted spread spectrum signal from the ventilation system by the at least one antenna; and
    transmitting the signal outside of the buildings;
    wherein transmitting the signal from the subscriber unit into the ventilation system comprises transmitting the signal through a portion of the ventilation system operating as a hollow leaky waveguide.

12. A method of communicating as in claim 11 further comprising:
    receiving a signal from outside of the building;
    if the signal is not in spread spectrum format, converting the signal to spread spectrum format;
    transmitting the spread spectrum signal through the antenna into the ventilation system;
    propagating the spread spectrum signal along multiple paths through the ventilation system; and
    receiving the signal from the ventilation system with the subscriber unit.

13. A method of communicating as in claim 11 wherein inserting at least one antenna into the ventilation system of the building comprises magnetically attaching at least one monopole antenna into the ventilation system.

14. A method of communicating as in claim 11 wherein propagating the spread spectrum signal comprises propagating the spread spectrum signal through an area formed between an inner surface defining a work area and an outer structural surface.

15. A method of communicating as in claim 11 wherein propagating the spread spectrum signal comprises propagating the spread spectrum signal along a plurality of paths.

16. A method of communicating as in claim 11 wherein the spread spectrum signals are CDMA signals.

17. A method of communicating with a spread spectrum subscriber unit located within a building comprising:
    inserting at least one antenna into a building ventilation system, the ventilation system including at least one passage functioning as a hollow leaky waveguide;

receiving a signal from outside of the building;
if the signal is not in spread spectrum format, converting the signal to spread spectrum format;
transmitting the spread spectrum signal through the antenna into the ventilation system;
propagating the spread spectrum signal along multiple paths through the ventilation system; and
receiving the signal from the ventilation system with the subscriber unit.

18. A wireless local area network for use within a building comprising:
a ventilation system disposed within the building, the ventilation system moving air throughout at least a portion of the building, the ventilation system including at least one passage operative to function as a hollow leaky waveguide;
a plurality of computers disposed within the building, each computer operative to transmit and receive data as spread spectrum signals through the ventilation system;
at least one server, the server providing data related services through spread spectrum signals to the computers; and
an antenna for each server, the antenna disposed within the ventilation system, the antenna sending and receiving spread spectrum signals.

19. A wireless local area network as in claim 18 wherein the antenna is a monopole antenna attached to a magnetic base.

20. A wireless local area network as in claim 18 wherein the at least one passage is a semirigid aluminum duct.

21. A wireless local area network as in claim 18 wherein the ventilation system comprises an area formed between an inner surface defining a work area and an outer structural surface.

22. A wireless local area network as in claim 18 wherein each computer is operative to receive a spread spectrum signal through multiple paths.

23. A wireless local area network as in claim 18 wherein the spread spectrum signals comprise CDMA signals.

24. A wireless local area network as in claim 18 wherein the spread spectrum signals operate around 1.9 GHz.

25. A wireless local area network as in claim 18 wherein the spread spectrum signals have a bandwidth of at least 1.25 MHz.

26. A telecommunication system for use inside a building comprising:
a wireless base station located away from the building;
at least one wireless repeater in communication with the wireless base station;
a ventilation system disposed within the building, the ventilation system moving air throughout at least a portion of the building, the ventilation system including at least one passage operative to function as a hollow leaky waveguide; and
at least one antenna disposed within the ventilation system in communication with each repeater, the antenna operative to transmit and receive spread spectrum signals through the ventilation system.

27. A telecommunication system for use inside a building comprising:
a wireless base station located away from the building, the wireless base station operative to communicate with wireless telecommunication devices through a plurality of sectors;
a plurality of wireless repeaters in communication with the wireless base station, each repeater physically associated with the building, each repeater relaying spread spectrum signals corresponding with one of the base station sectors;
a ventilation system disposed within the building, the ventilation system moving air throughout at least a portion of the building, the ventilation system including at least one passage operative to function as a hollow leaky waveguide; and
a plurality of antennas disposed within the ventilation system, each antenna in communication with one of the repeaters, each antenna operative to transmit and receive spread spectrum signals through the ventilation system along multiple paths, the antennas positioned so as to establish each base station sector in a different portion of the building.

* * * * *